US012748408B2

(12) United States Patent
Seenumani et al.

(10) Patent No.: US 12,748,408 B2
(45) Date of Patent: Sep. 29, 2026

(54) CONTROL SYSTEM AND METHOD FOR SMOOTH CHARACTERIZATION OF CYCLIC STRESS

(71) Applicant: Transportation IP Holdings, LLC, Norwalk, CT (US)

(72) Inventors: Gayathri Indra Seenumani, Niskayuna, NY (US); Kalpesh Singal, Ballston Spa, NY (US); Harry Kirk Mathews, Jr., Clifton Park, NY (US); Etika Agarwal, Bengaluru (IN)

(73) Assignee: Transportation IP Holdings, LLC, Norwalk, CT (US)

( * ) Notice: Subject to any disclaimer, the term of this patent is extended or adjusted under 35 U.S.C. 154(b) by 523 days.

(21) Appl. No.: 18/364,671

(22) Filed: Aug. 3, 2023

(65) Prior Publication Data

US 2024/0077861 A1 Mar. 7, 2024

Related U.S. Application Data

(60) Provisional application No. 63/403,076, filed on Sep. 1, 2022.

(51) Int. Cl.
*G05B 19/418* (2006.01)

(52) U.S. Cl.
CPC .................. *G05B 19/41885* (2013.01); *G05B 2219/21136* (2013.01)

(58) Field of Classification Search
CPC ...... G05B 13/00; G05B 19/04; G05B 19/402; G05B 23/00; B60L 15/20; B33Y 50/02; G01V 1/42; B28C 9/00
See application file for complete search history.

(56) References Cited

U.S. PATENT DOCUMENTS

2008/0071483 A1* 3/2008 Eaves ...................... H04Q 9/00 429/90
2023/0365024 A1* 11/2023 Reid ...................... B60L 8/003

* cited by examiner

*Primary Examiner* — Scott T Baderman
*Assistant Examiner* — Rokeya Shawali Alam
(74) *Attorney, Agent, or Firm* — K&L Gates LLP

(57) ABSTRACT

A control system and method obtain a stress profile of a device disposed onboard industrial equipment. The stress profile represents a stress characteristic of the device over time during operation of the industrial equipment. The system and method determine a smooth zero crossing function based on the stress profile. The smooth zero crossing function includes spikes that represent reversals of the stress characteristic. The system and method generate a control signal based on the smooth zero crossing function.

17 Claims, 4 Drawing Sheets

CONTROL SYSTEM AND METHOD FOR SMOOTH CHARACTERIZATION OF CYCLIC STRESS

CROSS-REFERENCE TO RELATED APPLICATIONS

This application is a non-provisional conversion of, and claims priority to, U.S. Provisional Patent Application No. 63/403,076, which was filed on Sep. 1, 2022, and the entire disclosure of which is incorporated herein by reference.

BACKGROUND

Technical Field

The subject matter described herein relates to characterizing cyclic stress of one or more industrial equipment devices, such as for integration into a movement planning system for a vehicular device.

Discussion of Art

Some items of industrial equipment include moving assemblies that have at least one energy storage module used to power propulsion of the moving assembly. For example, in hybrid vehicles, when a sufficient amount of electrical energy (e.g., charge) is stored in the energy storage module, a vehicle controller can selectively supply some of the stored electrical energy to one or more traction motors of the vehicle which rotate one or more wheels to propel the vehicle along a route. The vehicle controller may control which power source is utilized to power propulsion at different times and/or locations during a trip of the hybrid vehicle, and optionally may use both power sources to concurrently provide power for a period of time. The energy storage module is typically rechargeable and must be periodically recharged for continued intermittent operation.

Hybrid vehicles present an opportunity for movement planning systems in order to achieve or improve one or more objectives for a given trip, while abiding by a trip schedule. The objectives may include increased fuel efficiency (e.g., reduced fuel consumption) to complete the trip, reduced noise, reduced travel time, reduced fatigue/wear on vehicle equipment (e.g., reduced capacity fade or other type of fade on a battery pack, reduced fatigue on couplers, etc.), more consistent vehicle speeds (e.g., less acceleration and deceleration), and/or the like. For example, a control system can generate a trip plan that designates a first set of times in which a combustion engine powers propulsion of the vehicle along the route, a second set of times in which the energy storage module powers propulsion of the vehicle, and a third set of times in which the energy storage module is recharged via dynamic braking.

In order to properly consider tradeoffs between the objectives, a movement planning system should factor cyclic stress that is exerted on one or more devices of the vehicle attributable to operation of the vehicle according to one or more candidate movement plans. For example, a first plan that would provide greater fuel savings than a second plan, may not be a recommended or selected plan if the first plan causes more capacity fade (or other type of fade) of the battery pack than the second plan, resulting in a shorter operational life of the battery pack and earlier replacement.

Models and/or algorithms that simulate operational life and fatigue of industrial equipment devices may utilize cyclic data, such as cycle counts of the stress exerted on the device. Cycle counting may be generally discontinuous in nature. For example, a known system may count the number of times that the state of charge in a battery pack reverses to get a charge count and may compute the charge cycle times. These are discrete and discontinuous properties and may not be compatible with movement planning systems that perform optimization calculations. For example, the discontinuous nature of cycle counting used for a battery life model may be unsuitable for use in gradient-based optimization algorithms.

It may be desirable to have a control system and method that differs from those that are currently available.

BRIEF DESCRIPTION

In one or more embodiments, a control system is provided that includes one or more processors that may obtain a stress profile of a device disposed onboard industrial equipment. The stress profile may represent a stress characteristic of the device over time during operation of the industrial equipment. The one or more processors may determine a smooth zero crossing function based on the stress profile. The smooth zero crossing function may include spikes that represent reversals of the stress characteristic. The one or more processors may generate a control signal based on the smooth zero crossing function.

In one or more embodiments, a method is provided that may include obtaining a stress profile of a device disposed onboard industrial equipment. The stress profile represents a stress characteristic of the device over time during operation of the industrial equipment. The method may include determining, via one or more processors, a smooth zero crossing function based on the stress profile. The smooth zero crossing function may include spikes that represent reversals of the stress characteristic. The method may include generating, via the one or more processors, a control signal based on the smooth zero crossing function.

In one or more embodiments, a control system is provided that includes one or more processors that may be configured to obtain a state of charge (SOC) profile of a battery pack disposed onboard a vehicle. The SOC profile may represent a charge of the battery pack over time during a trip of the vehicle. The one or more processors may be configured to determine a smooth zero crossing function based on the SOC profile. The smooth zero crossing function includes spikes that represent charge reversals of the battery pack. The one or more processors may be configured to calculate a charge cycle count based on the smooth zero crossing function, and generate a control signal to communicate the charge cycle count.

BRIEF DESCRIPTION OF THE DRAWINGS

The inventive subject matter may be understood from reading the following description of non-limiting embodiments, with reference to the attached drawings, wherein.

DETAILED DESCRIPTION

Figure 1:
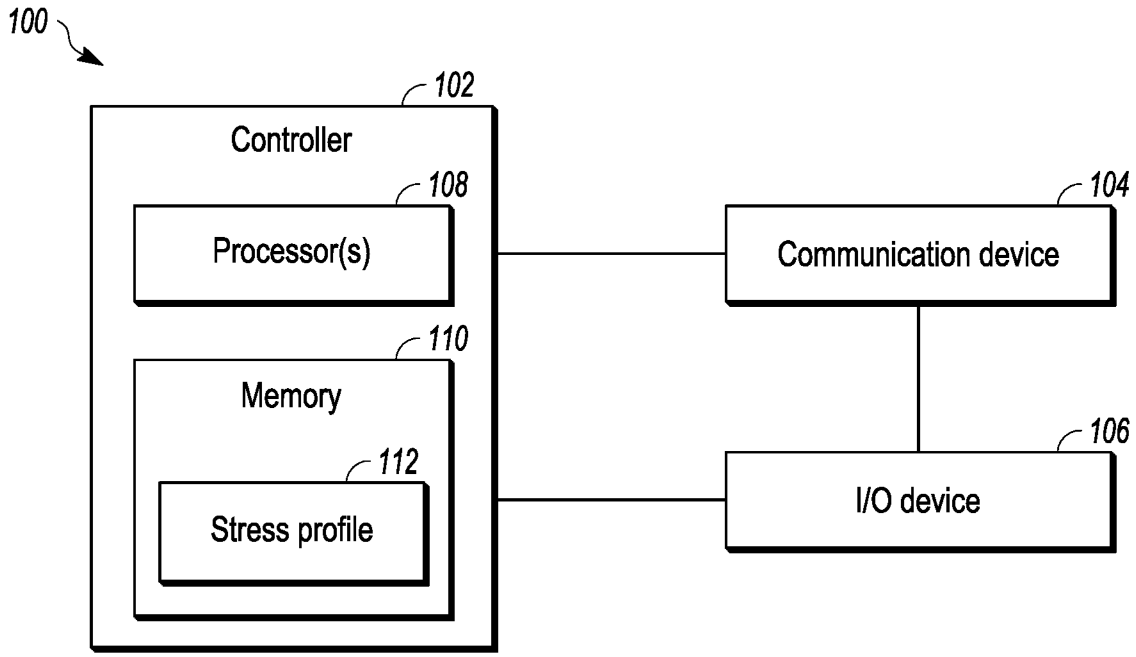
FIG. 1 is a block diagram of a control system according to an embodiment.

Embodiments of the subject matter described herein provide a smooth approximation for cyclic properties of a device onboard industrial equipment. The cyclic properties may include cycle counting and averaging. The smooth approximate enables integration of these properties into device life models and movement planning systems. The control systems and methods described herein generate a smooth zero crossing function based on a stress profile of the device. The smooth zero crossing function is then used to efficiently approximate cyclic properties related to stress, such as cycle count (e.g., number of cycles) and cycle depth (e.g., the change in stress from one cycle to the next). For example, the cycle count may be calculated by integrating the smooth zero crossing function. The cyclic stress-related properties may be used by the control system and method to generate a fatigue value, which represents a predicted amount of wear, fade, or the like, of the device during a trip, when the device is submitted to a specific stress profile. The fatigue value and/or one or more of the cyclic stress-related properties may be input into a movement planning system that compares different movement scenarios.

A smooth function may be a function that calculates and/or approximates one or more stress-related properties of a device rather than discretely counting and/or measuring the properties. For example, the smooth zero crossing function described herein includes zero crossings which represent reversals of a stress characteristic of the device. The stress characteristics may be state of charge of the device, compression or tension on the device, and/or the like. The smooth zero crossing function may be the basis upon which other stress-related properties are derived by the control system, such as cycle count, cycle time, cycle depth (e.g., change in stress between cycles), device fatigue, average cycle temperature, average cycle voltage, and/or the like.

The industrial equipment described herein includes onboard electrical energy storage devices that serve to power operation of the industrial equipment. For example, the industrial equipment may be moving assemblies, such as vehicles. The moving assemblies may include hybrid vehicles in which propulsion of the hybrid vehicles at a given moment may be powered by one or more internal combustion engines and/or one or more battery packs. For example, the battery pack(s) may supply electrical energy to one or more traction motors to power movement of the vehicle. The traction motor(s) are mechanically connected to axles and/or wheels of the vehicle and generate torque that rotates the wheels and propels the vehicle along a route.

In an embodiment, the industrial equipment is a rail vehicle, such as a locomotive, but not all embodiments are limited to rail vehicles. Unless expressly disclaimed or stated otherwise, the inventive subject matter described herein extends to other types of vehicles, such as buses, trucks (with or without trailers), automobiles, mining vehicles, agricultural vehicles, or other off-highway vehicles. The vehicles described herein (rail vehicles or other vehicles that do not travel on rails or tracks) can be part of a single vehicle system or a vehicle system of multiple vehicles. With respect to multi-vehicle systems, the vehicles can be mechanically coupled with each other (e.g., by couplers). For example, hybrid consists may include at least first and second propulsion-generating vehicles that are directly or indirectly coupled together. In an alternative embodiment, vehicles in a vehicle system may be logically coupled but not mechanically coupled. For example, vehicles may be logically but not mechanically coupled, and the discrete vehicles may communicate with each other to coordinate movements so that the vehicles travel together (e.g., as a convoy).

The industrial equipment described herein is not limited to moving assemblies (e.g., vehicles), and may include stationary industrial machinery. The device of the industrial machinery that is monitored according to the control system and method described herein may be any device that experiences cyclic stress during operation of the industrial equipment. For example, the industrial machinery may include fabrication equipment, such as a press that forms slabs or sheets of metal into a contoured shape.

The control system described herein may be a computer-based model and/or algorithm that has one or more functions. The model may be continuous and smooth for integration into a movement planning system (e.g., software). The control system may be an integrated component of a movement planning system or a discrete, separate component that is communicatively connected to the movement planning system. The movement planning system may be designed to plan and control operations of the vehicle. For example, the movement planning system may be Trip Optimizer™ of Wabtec Corp. The Trip Optimizer™ may generate a trip plan for the vehicle to travel along a route to a destination location. The trip plan may designate tractive and brake settings to be implemented by the vehicle at different times and locations during a particular trip of the vehicle with the intention of meeting or exceeding one or more objectives, such as to increase fuel efficiency, reduce noise, travel with a more consistent speed, and/or the like relative to traveling according to different control settings. The fatigue value and/or the stress-related characteristics derived based on the smooth zero crossing function generated by the control system may be incorporated into the generation of the trip plan by the movement planning system.

FIG. 1 is a block diagram of a control system 100 according to an embodiment. The control system includes a controller 102. The control system may also include a communication device 104 and/or an input/output (I/O) device 106. The control system may be disposed onboard a vehicle. Alternatively, the control system may be off-board a vehicle, such as at a data center, dispatch facility, off-board control system, or the like. The control system may interact, directly or indirectly, with one or more additional components onboard the vehicle, such as a vehicle controller, an energy management system, a movement planning system, a propulsion system, a battery pack, and/or the like.

The controller includes one or more processors 108. The controller refers to the one or more processors that perform some or all of the operations described herein to generate a smooth zero crossing function, generate one or more control signals based on the smooth zero crossing function, calculate stress-related characteristics based on the smooth zero crossing function, and/or determine a fatigue value of the device on a trip. The controller may be operably connected to the other components of the control system via wired and/or wireless communication links to permit the transmission of information in the form of signals. The controller may generate control signals that are transmitted to the other components to control operation of the components. For example, the controller may control the communication device, via one or more control signals, to transmit one or more messages. The controller may control the I/O device to display one or more messages to an operator (e.g., human operator). The control system may have additional components that are not shown in FIG. 1. In an alternative embodiment, the control system may lack one or more of the components that are shown in FIG. 1.

The controller represents hardware circuitry that includes the one or more processors 108 (e.g., one or more microprocessors, integrated circuits, microcontrollers, field programmable gate arrays, etc.). The controller may represent one or more control units or devices that are operably connected to perform the operations described herein. In an embodiment, the one or more processors may be disposed in a single, unitary control unit (e.g., a single piece of hardware equipment). In another embodiment, the controller may include multiple processors distributed among multiple different hardware devices (e.g., computers, servers, mobile devices, integrated onboard devices, etc.) which communicate with each other to perform the functions described herein associated with the controller.

The controller includes and/or is connected with a tangible and non-transitory computer-readable storage medium (e.g., data storage device), referred to herein as memory 110. The memory may store program instructions (e.g., software) that are executed by the one or more processors to perform the operations described herein. The program instructions may include one or more algorithms utilized by the one or more processors to generate one or more outputs. The outputs include a smooth zero crossing function and may include one or more stress-related characteristics and/or a fatigue value derived from the smooth zero crossing function, which can be used for planning movement of the vehicle. The program instructions may provide functions, models, and/or neural networks used to generate the outputs. The program instructions may further dictate actions to be performed by the one or more processors. One action may be to send a message for notifying an operator of the vehicle about the fatigue value on a device of the vehicle, where the fatigue value is based on a stress profile representing a stress characteristic of the device over time during a trip of the vehicle. Additional actions may include communicating control signals to a movement planning system for generating a trip plan that incorporates the fatigue value in a device life versus fuel savings tradeoff analysis and/or communicating control signals to a vehicle controller for automatically controlling operation of the device onboard the vehicle and/or the entire vehicle. The memory optionally may store applications, such as various application program interfaces (APIs) that link to cloud hosting services, via the communication device, for accessing information from remote storage devices (e.g., servers).

The communication device represents hardware circuitry that can communicate electrical signals via wireless communication pathways and/or wired conductive pathways. The communication device may include transceiving circuitry, one or more antennas, and the like, for wireless communication. The communication device may communicate directly with a client computer device (e.g., smartphone, tablet computer, laptop computer, etc.) of the operator of the vehicle or indirectly via a cellular tower, a modem, a router, and/or the like. For example, the controller may control the communication device to send a message to the client computer device of the operator. The message may include the smooth zero crossing function, one or more stress-related characteristics based on the smooth zero crossing function, and/or fatigue values of one or more devices onboard the vehicle attributable to operation of the devices during one or more trips.

The input/output (I/O) device allows an operator to receive information from the controller and optionally to interact with the control system by submitting user inputs. The I/O device may include one or more input devices designed to generate user command signals based on user manipulations (e.g., selections) provided on the input devices. For example, an input device may include or represent a touch sensitive screen or pad, a mouse, a keyboard, a joystick, a switch, a microphone, physical buttons, and/or the like. The I/O device may include a display device having a display screen that presents graphical indicia, such as text and symbols, for viewing by the user/operator. The controller may display a message on the screen of the display device to provide information to the operator. Optionally, the I/O device may include an audio speaker, one or more signal lights, and/or the like, for notifying and/or conveying information to the operator.

The memory may store additional information that is used by the controller. For example, the memory may include a database 112 for storing one or more stress profiles. Each stress profile represents a stress characteristic of a device onboard the vehicle over time during a trip of the vehicle. In a first example, the device is a battery pack of the vehicle that is used to power propulsion of the vehicle. The stress characteristic of the battery pack may be charge, or state of charge, of the battery pack over time during the trip. The state of charge represents the amount of electrical energy in the battery pack over time. The state of charge may also factor the rate or extent at which electrical energy is drawn from the battery pack during discharge operations and supplied to the battery pack during charge operations. The state of charge is cyclic and undergoes reversals, as the battery pack may experience several charge cycles during a single trip of the vehicle. A reversal occurs when the battery pack switches from a charge state to a discharge state, and vice-versa. For example, the battery pack may charge via regenerative braking as the vehicle traverses a downhill segment of a route during the trip. The battery pack may discharge to supply electrical power for providing a propulsion boost as the vehicle travels along an uphill segment of the route during the trip.

The battery pack degrades over time, as the battery cells fade. The fade may be capacity fade, resistance fade, and/or calendar fade. The fade may be affected by the number of charge cycles, the rate at which electrical power is directed to and from the battery pack, and the amount of the electrical power that is directed to and from the battery pack during each charge cycle. For example, increasing the number of charge cycles during a trip may cause greater fade than a reduced number of charge cycles. In another example, charging and/or discharging the battery pack with an increased electric current level may cause greater fade than a lower electric current level. Discharging the battery pack to a depleted level of charge may cause greater fade than limiting the depth of discharge to ensure that the charge remains above the depleted level. Charging and discharging operations exert stress on the battery pack and may contribute to fatigue of the battery pack in the form of fade. Capacity fade may represent a gradual reduction in the charge capacity of the battery pack over time, such that a battery pack that has experienced capacity fade is not able to store as much electrical energy as the battery pack used to store prior to the capacity fade. Resistance fade may represent a gradual change in cell resistance of the cells of the battery pack over time.

The stress profile may be a state of charge (SOC) profile of the battery pack. The SOC profile may represent a plan or simulation that characterizes the charge of the battery pack over time during the trip. The SOC profile may include a first set of times and/or locations during the trip at which the battery pack charges and a second set of times and/or locations during the trip at which the battery pack discharges. The SOC profile may also provide the level of charge (e.g., amount of electrical energy) in the battery pack during each charge operation and/or discharge operation. For example, the SOC profile may represent the charge in the battery pack over time during the trip, which can be plotted in a line graph. The charge increases during charge operations, decreases during discharge operations, and may remain approximately constant (e.g., except for nominal charge leakage such as a fixed small fraction) outside of the charge and discharge operations. For example, when the battery pack sits idle, it may still undergo degradation referred to as calendar fade. The extent or rate of calendar fade may depend on the SOC, how long the battery packs remains at that SOC, and ambient conditions. For example, the calendar fade may increase if the battery pack is left at a higher SOC and/or in higher ambient conditions than if left at a lower SOC and/or a lower ambient condition. Capacity fade may be influenced both by calendar fade and cyclic modes.

The device onboard the vehicle that experiences stress, and is analyzed by the control system, is not limited to the battery pack. For example, mechanical devices experience stress in the form of tension, compression, friction, shear stress, and/or the like. One example device is a coupler. The coupler mechanically connects the vehicle to another propulsion-generating vehicle and/or a trailer. The stress profile associated with the coupler may represent, as the stress characteristic, forces exerted on the coupler, such as tensile stress and compressive stress. The stress characteristic optionally may include friction on coupling surfaces of the coupler, which may wear over time as the coupler pulls and/or is pushed by the second vehicle and/or trailer during the trip. Like the charge of the battery pack, the stress profile of the coupler may be cyclical with reversals as the forces on the coupler transition from tension to compression and vice-versa. The control system optionally may analyze other onboard devices of the vehicle to generate a smooth zero crossing function based on cyclical stresses exerted on the devices. Such devices may include devices that move and/or have moving components, such as wheels, combustion engines, traction motors, alternators, and/or the like.

In one or more embodiments, the controller obtains the stress profile of a device disposed onboard a vehicle. Optionally, the controller may obtain the stress profile by accessing the memory or by communicating with a remote storage device via the communication device and/or a network connection. Optionally, the controller may generate the stress profile based on information about the trip and the vehicle. For example, the controller may obtain a trip plan that dictates tractive settings, brake settings, speeds to be traveled, and/or the like during the trip, and the controller may generate the stress profile based on the trip plan. As described above, in the context of a battery pack, the stress profile may be a SOC profile.

Figure 2:
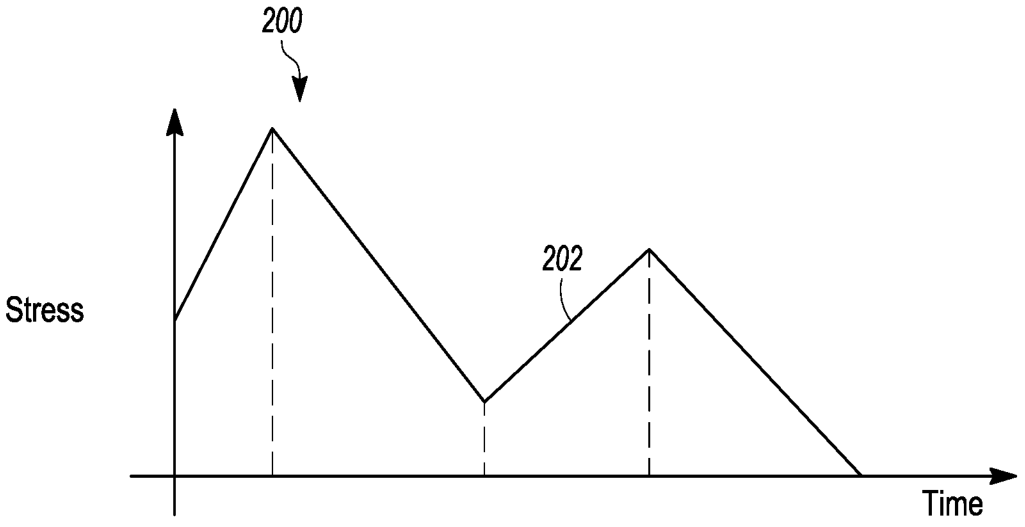
FIG. 2 illustrates a graph depicting a stress profile representing a stress characteristic of a vehicle device over time.

FIG. 2 illustrates a graph 200 depicting a stress profile 202 representing a stress characteristic of a vehicle device over time. The vertical axis is the stress characteristic, and the horizontal axis is time. In an embodiment, when the device is a battery pack, the stress profile may be a SOC profile, indicating an amount or level of charge (e.g., electrical energy) present in the battery pack over time during a trip. The charge level increases during charge operations, and decreases during discharge operations, such as to power propulsion of the vehicle.

Figure 3:
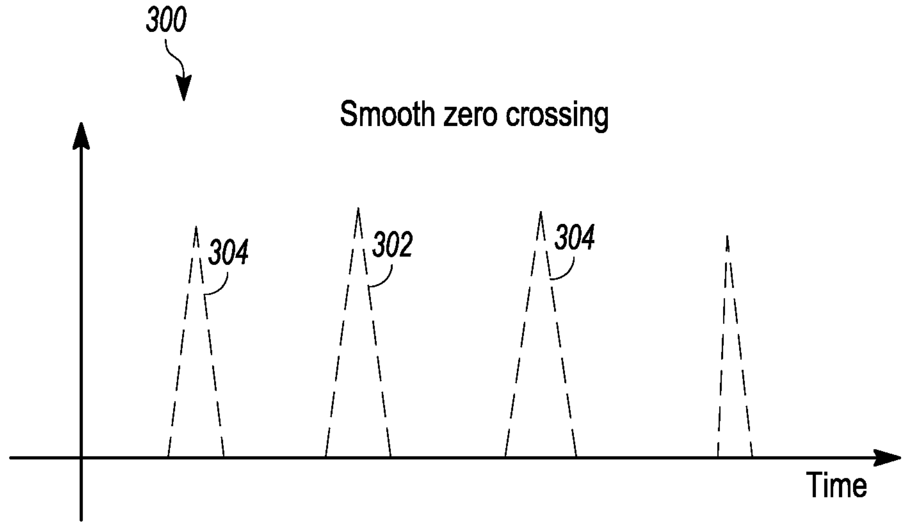
FIG. 3 illustrates a graph depicting a smooth zero crossing function according to an embodiment.

The controller may generate a smooth zero crossing function based on the stress profile. FIG. 3 illustrates a graph 300 depicting a smooth zero crossing function 302 according to an embodiment. The smooth zero crossing function may be based on the stress profile shown in FIG. 2. The smooth zero crossing function may include spikes or projections 304 that represent reversals of the stress characteristic. The spikes indicate that the reversals occur at different times during the trip. The reversals in the smooth zero crossing function may align in time with the peaks and troughs in the stress profile shown in FIG. 2.

In an embodiment, the controller may determine the smooth zero crossing function by applying a signum function to the stress profile, and then applying an exp function to an output of the signum function. The signum (or sign) function may be represented by Equation (a):

$$\mathrm{Sign}(x) = \frac{x}{\sqrt{x^2 + \varepsilon}}. \qquad \text{Equation (a)}$$

The exp function may be represented by Equation (b):

$$g(x) = 1 - \frac{1}{1 + e^{-50x}}. \qquad \text{Equation (b)}$$

An output of the exp function may be zero when the output of the signum function is one. The output of the exp function may be one whenever the output of the signum function is not one.

When the device is a battery pack and the stress profile is a SOC profile of the battery pack during the trip, the spikes of the smooth zero crossing function may represent charge reversals of the battery pack during operation. When the device is a coupler, the stress profile may represent mechanical stress on the coupler. In that case, the spikes of the smooth zero crossing function may represent stress reversals of the coupler during operation (e.g., during the trip).

The controller may calculate the smooth zero crossing function according to Equation (c):

$$y(k)=(1-zc(k))*y(k-1)+zc(k)*u(k-1) \qquad \text{Equation (c)}$$

where y is the smooth zero crossing function, k is a current cycle, zc is a zero crossing, and u is the stress profile.

After determining the smooth zero crossing function, the controller may calculate one or more stress-related characteristics (e.g., properties, parameters, etc.) based on the smooth zero crossing function. For example, the controller may calculate the cycle count of the device during the trip based on the smooth zero crossing function (without counting discrete cycles). The cycle count may represent the number of cycles of the stress characteristic, such as the number of charge cycles of the battery pack. In an embodiment, the controller may calculate the cycle count based on an integral of the smooth zero crossing function. The controller may determine the cycle count based on the smooth zero crossing function according to Equation (d):

$$\mathrm{CYCLECOUNT}(k)=y(k) \text{ if } u(k)=1 \qquad \text{Equation (d).}$$

Figure 4:
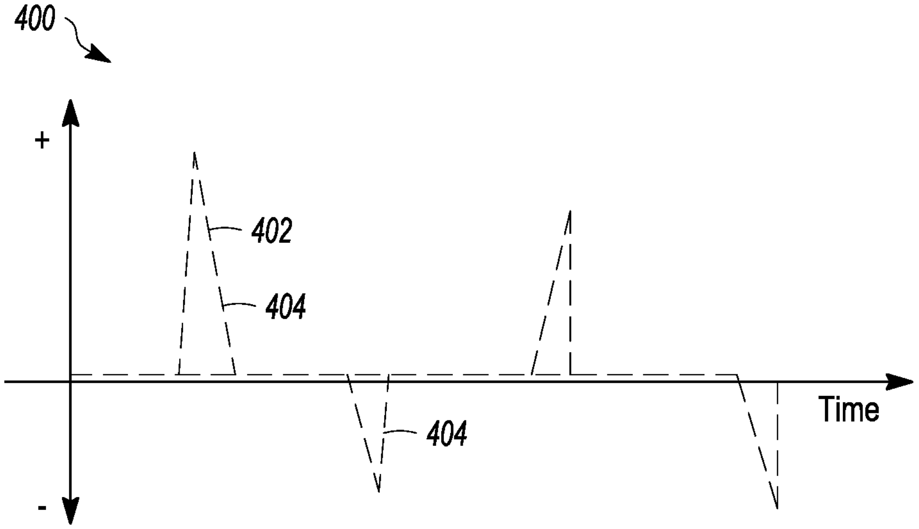
FIG. 4 is a graph depicting a cycle depth profile based on the smooth zero crossing function shown in FIG. 3 and the stress profile shown in FIG. 2.

Another stress-related characteristic that may be calculated by the controller based on the smooth zero crossing function is cycle depth (e.g., a cycle depth profile). FIG. 4 is a graph 400 depicting a cycle depth profile or function 402 based on the smooth zero crossing function shown in FIG. 3 and the stress profile shown in FIG. 2. The controller may determine the cycle depth profile based on an instantaneous zero crossing of the smooth zero crossing function. The cycle depth profile may indicate the change in stress between adjacent reversals in the stress characteristic (e.g., adjacent spikes in the smooth zero crossing function). For example, when the stress characteristic in the stress profile increases, the spike 404 at the time of a corresponding zero crossing is positive. When the stress characteristic decreases, the spike 404 at the time of the corresponding zero crossing is negative. In an embodiment in which the stress profile is a SOC profile of a battery pack, the cycle depth may represent depth of discharge for each charge cycle. The controller may determine a cycle depth of the stress characteristic of the device based on the smooth zero crossing function according to Equation (e):

$$\text{CYCLEDEPTH}(k)=y(k)-y(k-1)\text{ if }u(k)=\text{STRESS}(k)\qquad\text{Equation (e).}$$

Figure 5:
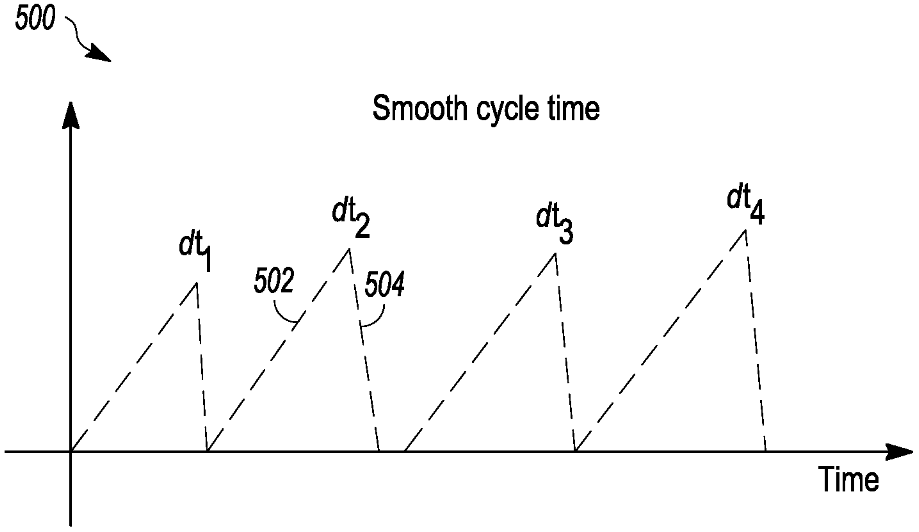
FIG. 5 is a graph depicting a cycle time profile based on the smooth zero crossing function shown in FIG. 3.

The one or more stress-related characteristics may include a cycle time (e.g., smooth cycle time) of the stress characteristic of the device based on the smooth zero crossing function. The cycle time may represent the amount of time of each cycle. FIG. 5 is a graph 500 depicting a cycle time profile or function 502 based on the smooth zero crossing function shown in FIG. 3. The spikes or peaks 504 in the cycle time profile may represent the time lengths of the cycles. The controller may calculate the cycle time according to Equation (f):

$$\text{CYCLETIME}(k)=y(k)-y(k-1)\text{ if }u(k)=t(k)\qquad\text{Equation (f)}$$

where t is the time in seconds at the current cycle k.

Optionally, one or more additional stress-related characteristics may be calculated based on the smooth zero crossing function to determine a fatigue value of the device during the trip attributable to the stress profile. The fatigue value may represent the amount of wear, degradation, fade, and/or the like that is predicted to occur to the device onboard the vehicle during the trip of the vehicle when the device is exposed to the stress characteristics in the stress profile. For example, when the device is the battery pack, the fatigue value may be fade of the battery pack. The fade may be the amount of capacity loss attributable to the charge cycling during the trip of the vehicle.

In an embodiment, to determine the fatigue value (e.g., fade of a battery pack), the controller may use average temperature of the device per cycle and average voltage of the device per cycle as two additional stress-related characteristics. The cycle depth, or more specifically depth of discharge, may be another characteristic used to determine the fatigue value. The average temperature and average voltage per cycle may each be based on both the smooth zero crossing function and the cycle count. The controller may obtain a temperature profile of the device over time during the trip. The temperature profile is associated with the stress profile. The controller may calculate the average temperature of the device per cycle based at least in part on the temperature profile and the cycle count. For example, the temperature profile divided by the cycle count may output the average temperature. The controller may obtain a voltage profile of the device of time during the trip. The voltage profile may be associated with the stress profile. The voltage profile may represent the voltage of battery pack over time during the trip. The voltage may be based on the electrical current that is supplied to the battery pack and/or discharged from the battery pack. The controller may calculate the average voltage of the device per cycle based at least in part on the voltage profile and the cycle count.

The controller may determine the fatigue value of the device for the trip, attributable to the stress characteristic, based at least on the average temperature, the average voltage, and the cycle depth. For example, the controller may use the average temperature, average voltage, and depth of discharge to determine (e.g., estimate) fade of the battery pack of the vehicle during the trip. The fade may be capacity fade. The controller may input the average temperature, average voltage, and depth of discharge into a battery life model that outputs a predicted amount of fade. The fade which represents the fatigue value may be in units of measurement (e.g., volts, amps, amp*hours (AH), or the like) or a percentage or ratio relative to an initial capacity. For example, the controller may determine that the stress profile on the battery pack during a trip is predicted to reduce the capacity of the battery pack by 0.2%. For other devices onboard the vehicle, the fatigue value may be based on at least some different stress-related characteristics than fade.

The controller may obtain an estimated fuel savings for operating the vehicle on the trip according to the stress profile. The estimated fuel savings may be obtained from a movement planning system that factors tractive and brake settings of the vehicle over time during the trip. For example, utilizing the battery pack to selectively provide power generation to supplement operation of a combustion engine may provide fuel savings relative to only using the combustion engine to power propulsion during the trip. Other power supply devices may be used instead of, or in addition to, the battery pack to provide fuel savings over combustion engines alone. Such additional power supply devices may include photovoltaic cells, fuel cells, and/or the like.

After obtaining the estimated fuel savings, the controller may calculate a fuel savings per fatigue value for the stress profile based on the estimated fuel savings and the fatigue value. The fuel savings per fatigue value may be a ratio and/or quotient of the fuel savings divided by the fatigue value. The controller may use the fuel savings per fatigue value in a cost-benefit analysis of a proposed/candidate movement plan/stress profile for the trip of the vehicle. For example, the controller may compare the fuel savings per fatigue value of multiple different candidate movement plans/stress profiles to rank the candidate movement plans/stress profiles relative to one another.

The stress profile used to generate the smooth zero crossing function may be a first stress profile for the device. The controller may obtain a set of multiple different stress profiles for the device according to the same trip of the vehicle. Each of the stress profiles may have a different configuration of one or more stress characteristics exerted on the device during the trip. The different stress characteristics may be based on different usage operations of the device, such as different tractive and brake settings of the vehicle which exert different amounts and/or types of force on the device at different times. The controller may determine respective fatigue values for each of the stress profiles in the set by independently performing the steps above for each of the stress profiles. Some stress profiles may cause greater fatigue on the device during the trip than other stress profiles. Optionally, one or more of the stress profiles that are compared by the controller are selected by an operator using the I/O device, such as from a stored list of stress profiles associated with the vehicle and/or the trip.

The controller may compare the output fatigue values, independently or in consideration of additional predicted parameters of the trip, such as amount of fuel consumed, to select one or more recommended stress profiles from the set. For example, the controller may designate one or a few of the stress profiles as recommended or selected stress profiles based on the recommended stress profile(s) having a smaller fatigue value and/or greater fuel savings per fatigue value than all or at least some of the other stress profiles in the set.

Optionally, the controller may analyze the stress profiles and compare the fatigue values to determine a new, revised stress profile. For example, the controller may perform the operations described above to determine the fatigue value for a first stress profile of the device associated with a first trip of the vehicle. The controller may use the output of the algorithm (e.g., the fatigue value) to generate a second stress profile of the device for the same trip. The controller optionally may analyze the fatigue values generated from a set of multiple stress profiles of the device and use that information to construct the second stress profile. For example, the controller may use previously generated stress profiles in an optimization function or model to select the configuration of a revised, second stress profile, to generate a more preferred stress profile. The controller may tailor the second stress profile to have settings/operations that are more similar to stress profiles that have more desirable outputs (e.g., a lower fatigue value) and less similar to stress profiles that have less desirable outputs (e.g., a higher fatigue value). The controller may use the outputs (e.g., fatigue values) and known input parameters of the stress profiles to iteratively generate a stress profile that has more desirable outputs than all, or at least some, of the other stress profiles analyzed. The controller may continue this sequence for multiple iterations to focus or hone-in on a more optimal stress profile, compared to an initial stress profile. As such, the second stress profile is generated by the controller based on the fatigue value of the first stress profile. This process may be supervised by an operator and used to train an artificial neural network for generating the stress profiles.

In either case (e.g., selecting a stress profile from the set or generating a revised stress profile), the controller may analyze and compare the stress profiles based at least in part on the output fatigue values. For example, if a first stress profile has a greater estimated fuel savings per fatigue value than a second stress profile, the controller may rank the first stress profile higher than the second stress profile during the analysis. For example, the controller may select the first stress profile over the second stress profile as the recommended stress profile. In another example, the controller may weigh the first stress profile more heavily than the second stress profile to generate a revised stress profile.

In an embodiment, the controller may generate a control signal based on the smooth zero crossing function and/or the values derived based on the smooth zero crossing function. For example, the controller may generate the control signal to provide stress-related output information determined by the operations described above. The stress-related output information that is conveyed may include the smooth zero crossing function, the cycle count, the cycle depth profile, the cycle time, the fatigue value of the device attributable to the trip, the estimated fuel savings per fatigue value attributable to the trip, and/or the like.

The control signal may communicate the stress-related output information in a message to an operator of the vehicle and/or the off-board control system. For example, the control signal may control the communication device and/or the I/O device to send the message. The communication device may wirelessly transmit the message to a client computer device (e.g., smartphone) of the operator. In another example, the control signal may cause the I/O device to display the message on a display screen. The message optionally may include the stress profile along with stress-related output information. Optionally, the message may include multiple stress profiles (and/or movement plans for the vehicle) and output information associated with different stress profiles. The message may enable the operator to select one of the stress profiles (or movement plans) to implement. After selection and/or approval by the operator, a vehicle controller of the vehicle may automatically implement the approved stress profile (or movement plan) during travel of the vehicle. Optionally, a copy of the message may be sent to the off-board control system, such as a server.

Optionally, the controller may generate the control signal to control operation of the device onboard the vehicle during the trip. For example, when the device is a battery pack, the controller may generate the control signal to control charge operations and discharge operations of the battery pack during the trip of the vehicle according to a stress profile that is selected or recommended. Optionally, the control signal may be transmitted to a vehicle controller to control charging and discharging of the battery pack during the trip according to the SOC profile. More specifically, the vehicle controller may implement the selected or recommended SOC profile by selectively actuating switch devices and/or other circuitry to control current into and from the battery pack, according to the SOC profile, based on progress of the vehicle during the trip.

In an example, the control system may perform a cost analysis that considers the cost of fuel and the cost associated with replacing the device at end of life. For example, the estimated fuel savings per device fatigue value can be converted to a cost ratio or value. The cost of replacing the device at the end of life reduces the savings attributable to less fuel consumed. The controller may factor these costs when comparing the different stress profiles and selecting the recommended stress profile and/or generating the revised stress profile, such that the final stress profile is more cost-effective than all or at least some of the other stress profiles.

Figure 6:
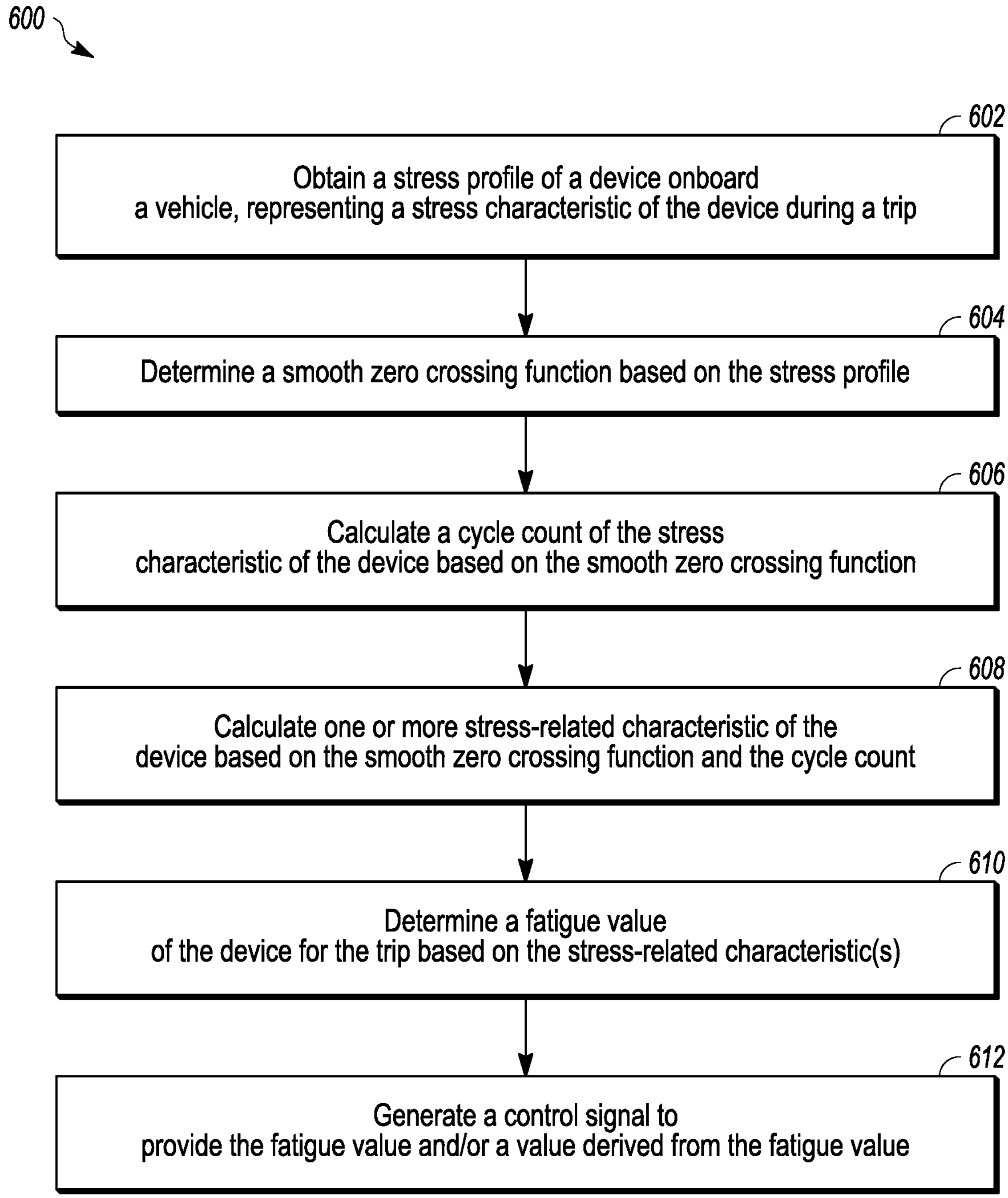
FIG. 6 is a flow chart of a method of generating a smooth approximation of cycle stress on a vehicle device during a trip according to an embodiment.

FIG. 6 is a flow chart of a method 600 of generating a smooth approximation of cycle stress on a vehicle device during a trip according to an embodiment. The method may be performed in whole or in part by the controller of the control system shown in FIG. 1. The method optionally may include more steps than shown, fewer steps than shown, and/or different steps than shown in FIG. 6. The order of the steps may be performed in any order that is practical, unless otherwise stated.

At step 602, a stress profile of a device disposed onboard a vehicle is obtained. The stress profile represents a stress characteristic of the device over time during a trip of the vehicle.

At step 604, a smooth zero crossing function is determined based on the stress profile. The smooth zero crossing function may be determined by the controller (e.g., one or more processors) of the control system. The smooth zero crossing function may include spikes that represent reversals of the stress characteristic over time. Optionally, determining the smooth zero crossing function may include applying a signum function to the stress profile, and then applying an exp function to an output of the signum function. An output of the exp function may be zero when the output of the signum function is one, and the output of the exp function may be one whenever the output of the signum function is not one. Optionally, calculating the smooth zero crossing function may include inputting the stress profile into Equation (c):

$$y(k)=(1-zc(k))*y(k-1)+zc(k)*u(k-1) \quad \text{Equation (c)}$$

where y is the smooth zero crossing function, k is a current cycle, zc is a zero crossing, and u is the stress profile.

At step 606, a cycle count of the stress characteristic of the device is calculated. The cycle count may be calculated based on an integral of the smooth zero crossing function.

At step 608, one or more additional stress-related characteristics of the device are calculated based on the smooth zero crossing function. For example, the stress-related characteristics may include an average temperature of the device per cycle, an average voltage of the device per cycle, and a cycle depth profile. The device may be a battery pack that can power propulsion of the vehicle. The average temperature, average voltage, and cycle depth profile may each be based on both the smooth zero crossing function and the cycle count. The cycle depth profile may include a change in stress between adjacent spikes in the smooth zero crossing function. When the device is the battery pack, the cycle depth profile may be a depth of discharge profile.

At step 610, a fatigue value of the device for the trip is determined. The fatigue value is attributable to the stress characteristic. The fatigue value may be based on the additional stress-related characteristics, such as the average temperature, the average voltage, and the cycle depth profile.

At step 612, a control signal is generated based on the smooth zero crossing function. The control signal may be generated by the controller (e.g., the one or more processors). The control signal may be generated to provide the fatigue value of the device to an operator of the vehicle and/or an off-board control system. Optionally, the control signal may provide a value derived from the fatigue value, such as an estimated fuel savings per device fatigue value.

In one or more embodiments, a control system includes one or more processors configured to obtain a stress profile of a device disposed onboard industrial equipment. The stress profile may represent a stress characteristic of the device over time during operation of the industrial equipment. The one or more processors may determine a smooth zero crossing function based on the stress profile. The smooth zero crossing function may include spikes that represent reversals of the stress characteristic. The one or more processors may generate a control signal based on the smooth zero crossing function.

Optionally, the one or more processors may calculate a cycle count of the stress characteristic of the device based on the smooth zero crossing function. The one or more processors may calculate the cycle count based on an integral of the smooth zero crossing function. Optionally, the one or more processors are configured to calculate an average temperature of the device per cycle, an average voltage of the device per cycle, and a cycle depth profile based on the smooth zero crossing function and the cycle count. The cycle depth profile may include a change in stress between adjacent spikes in the smooth zero crossing function. The one or more processors may determine a fatigue value of the device attributable to the stress characteristic based on the average temperature, the average voltage, and the cycle depth profile. The one or more processors may generate the control signal to provide the fatigue value of the device to one or more of an operator of the industrial equipment or an off-board control system. The one or more processors may determine the cycle depth profile based on an instantaneous zero crossing of the smooth zero crossing function. Optionally, the stress profile is a first stress profile, and the one or more processors may generate a second stress profile for the operation of the industrial equipment based on the fatigue value of the device.

Optionally, the stress profile is a first stress profile in a set of multiple different stress profiles. The one or more processors may select the first stress profile from the other stress profiles in the set based at least on the fatigue value of the device in the first stress profile being less than in one or more of the other stress profiles in the set. Optionally, the one or more processors may obtain a temperature profile of the device over time and a voltage profile of the device over time. The temperature profile and the voltage profile may each be associated with the stress profile. The one or more processors may calculate the average temperature of the device per cycle based at least in part on the temperature profile, and may calculate the average voltage of the device per cycle based at least in part on the voltage profile. Optionally, the one or more processors may obtain an estimated fuel savings for operating the industrial equipment according to the stress profile, and may determine a fuel savings per fatigue value for the stress profile based on the estimated fuel savings and the fatigue value. The one or more processors may generate the control signal to notify an operator of the fuel savings per fatigue value for the stress profile.

Optionally, the device may be a battery pack, the stress profile may be a state of charge profile of the battery pack, and the spikes of the smooth zero crossing function may represent charge reversals of the battery pack during operation. Optionally, the industrial equipment may include a first vehicle and a second vehicle. The device may be a coupler that mechanically couples the first vehicle to the second vehicle. The stress profile may represent mechanical stress on the coupler. The spikes of the smooth zero crossing function may represent stress reversals of the coupler during operation. Optionally, the industrial equipment may be a vehicle, the device may be a battery pack onboard the vehicle, and the one or more processors may generate the control signal to control charge and discharge operations of the battery pack during a trip of the vehicle according to the stress profile.

Optionally, the one or more processors may determine the smooth zero crossing function by applying a signum function to the stress profile and applying an exp function to an output of the signum function. An output of the exp function may be zero when the output of the signum function is one. The output of the exp function may be one whenever the output of the signum function is not one.

Optionally, the one or more processors may calculate the smooth zero crossing function according to Equation (c):

$$y(k)=(1-zc(k))*y(k-1)+zc(k)*u(k-1) \quad \text{Equation (c)}$$

where y is the smooth zero crossing function, k is a current cycle, zc is a zero crossing, and u is the stress profile.

Optionally, the one or more processors may determine a cycle count of the stress characteristic of the device based on the smooth zero crossing function according to Equation (d):

$$\text{CYCLECOUNT}(k)=y(k) \text{ if } u(k)=1 \quad \text{Equation (d).}$$

Optionally, the one or more processors may calculate a cycle depth of the stress characteristic of the device based on the smooth zero crossing function according to Equation (e):

$$\text{CYCLEDEPTH}(k)=y(k)-y(k-1) \text{ if } u(k)=\text{STRESS}(k) \quad \text{Equation (e).}$$

Optionally, the one or more processors may calculate a cycle time of the stress characteristic of the device based on the smooth zero crossing function according to Equation (f):

$$CYCLETIME(k)=y(k)-y(k-1) \text{ if } u(k)=t(k) \qquad \text{Equation (f)}$$

where t is the time in seconds at the current cycle k.

In one or more embodiments, a method may include obtaining a stress profile of a device disposed onboard industrial equipment. The stress profile may represent a stress characteristic of the device over time during operation of the industrial equipment. The method may include determining, via one or more processors, a smooth zero crossing function based on the stress profile. The smooth zero crossing function may include spikes that represent reversals of the stress characteristic. The method may include generating, via the one or more processors, a control signal based on the smooth zero crossing function.

Optionally, determining the smooth zero crossing function may include applying a signum function to the stress profile and applying an exp function to an output of the signum function. An output of the exp function may be zero when the output of the signum function is one. The output of the exp function may be one whenever the output of the signum function is not one. Optionally, calculating the smooth zero crossing function may include inputting the stress profile into Equation (c):

$$y(k)=(1-zc(k))*y(k-1)+zc(k)*u(k-1) \qquad \text{Equation (c)}$$

where y is the smooth zero crossing function, k is a current cycle, zc is a zero crossing, and u is the stress profile.

Optionally, the method may include calculating a cycle count of the stress characteristic of the device based on an integral of the smooth zero crossing function. Optionally, the method includes calculating an average temperature of the device per cycle, an average voltage of the device per cycle, and a cycle depth profile based on the smooth zero crossing function and the cycle count. The cycle depth profile may include a change in stress between adjacent spikes in the smooth zero crossing function. The method may include determining a fatigue value of the device attributable to the stress characteristic based on the average temperature, the average voltage, and the cycle depth profile. Optionally, the control signal may be generated to provide the fatigue value of the device to one or more of an operator of the industrial equipment or an off-board control system.

In one or more embodiments, a control system may include one or more processors configured to obtain a state of charge (SOC) profile of a battery pack disposed onboard a vehicle. The SOC profile may represent a charge of the battery pack over time during a trip of the vehicle. The one or more processors may determine a smooth zero crossing function based on the SOC profile. The smooth zero crossing function may include spikes that represent charge reversals of the battery pack. The one or more processors may calculate a charge cycle count based on the smooth zero crossing function and generate a control signal to communicate the charge cycle count.

Optionally, the one or more processors may calculate an average temperature of the battery pack per cycle, an average voltage of the battery pack per cycle, and a depth of discharge (DOD) profile based on the smooth zero crossing function and the charge cycle count. The one or more processors may determine a fatigue value of the battery pack attributable to the SOC profile for the trip based on the average temperature, the average voltage, and the DOD profile. The control signal may be generated to communicate the fatigue value in addition to the charge cycle count.

In one embodiment, the controllers or systems described herein may have a local data collection system deployed and may use machine learning to enable derivation-based learning outcomes. The controllers may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used making determinations, calculations, comparisons and behavior analytics, and the like. For example, the controller of the control system described herein may use machine learning to enable determining the fatigue value of the device for the trip based on the smooth zero crossing function.

In one embodiment, the controllers may include a policy engine that applies one or more policies. These policies may be based at least in part on characteristics of a given item of equipment or environment. With respect to control policies, a neural network can receive input of a number of environmental and task-related parameters. These parameters may include, for example, operational input regarding operating equipment, data from various sensors, location and/or position data, and the like. The neural network can be trained to generate an output based on these inputs, with the output representing an action or sequence of actions that the equipment or system should take to accomplish the goal of the operation. During operation of one embodiment, a determination can occur by processing the inputs through the parameters of the neural network to generate a value at the output node designating that action as the desired action.

This action may translate into a signal that causes the vehicle to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models is obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A control system comprising:

one or more processors configured to:

obtain a stress profile of a device disposed onboard industrial equipment, the stress profile representing a stress characteristic of the device over time during operation of the industrial equipment;

determine a smooth zero crossing function based on the stress profile, the smooth zero crossing function including spikes that represent reversals of the stress characteristic; and generate a control signal based on the smooth zero crossing function, wherein the one or more processors are configured to calculate the smooth zero crossing function according to Equation (c):

$$y(k)=(1-zc(k))*y(k-1)+zc(k)*u(k-1) \quad \text{Equation (c)}$$

where y is the smooth zero crossing function, k is a current cycle, zc is a zero crossing, and u is the stress profile.

2. The control system of claim 1, wherein the one or more processors are configured to calculate a cycle count of the stress characteristic of the device based on the smooth zero crossing function.

3. The control system of claim 2, wherein the one or more processors are configured to:

calculate an average temperature of the device per cycle, an average voltage of the device per cycle, and a cycle depth profile based on the smooth zero crossing function and the cycle count, the cycle depth profile including a change in stress between adjacent spikes in the smooth zero crossing function; and determine a fatigue value of the device attributable to the stress characteristic based on the average temperature, the average voltage, and the cycle depth profile.

4. The control system of claim 3, wherein the one or more processors are configured to generate the control signal to provide the fatigue value of the device to one or more of an operator of the industrial equipment or an off-board control system.

5. The control system of claim 3, wherein the one or more processors are configured to determine the cycle depth profile based on an instantaneous zero crossing of the smooth zero crossing function, and to determine the cycle count based on an integral of the smooth zero crossing function.

6. The control system of claim 3, wherein the stress profile is a first stress profile in a set of multiple different stress profiles, and the one or more processors are configured to select the first stress profile from the other stress profiles in the set based at least on the fatigue value of the device in the first stress profile being less than in one or more of the other stress profiles in the set.

7. The control system of claim 3, wherein the one or more processors are configured to obtain a temperature profile of the device over time and a voltage profile of the device over time, the temperature profile and the voltage profile each associated with the stress profile, the one or more processors configured to calculate the average temperature of the device per cycle based at least in part on the temperature profile, and to calculate the average voltage of the device per cycle based at least in part on the voltage profile.

8. The control system of claim 3, wherein the one or more processors are configured to obtain an estimated fuel savings for operating the industrial equipment according to the stress profile, and determine a fuel savings per fatigue value for the stress profile based on the estimated fuel savings and the fatigue value.

9. The control system of claim 1, wherein the device is a battery pack, the stress profile is a state of charge profile of the battery pack, and the spikes of the smooth zero crossing function represent charge reversals of the battery pack during operation.

10. The control system of claim 1, wherein the industrial equipment comprises a first vehicle and a second vehicle, and the device is a coupler that mechanically couples the first vehicle to the second vehicle, wherein the stress profile represents mechanical stress on the coupler, and the spikes of the smooth zero crossing function represent stress reversals of the coupler during operation.

11. The control system of claim 1, wherein the industrial equipment is a vehicle, the device is a battery pack onboard the vehicle, and the one or more processors are configured to generate the control signal to control charge and discharge operations of the battery pack during a trip of the vehicle according to the stress profile.

12. The control system of claim 1, wherein the one or more processors are configured to one or more of:

(i) determine a cycle count of the stress characteristic of the device based on the smooth zero crossing function according to Equation (d):

$$\text{CYCLECOUNT}(k)=y(k) \text{ if } u(k)=1 \qquad \text{Equation (d);}$$

(ii) calculate a cycle depth of the stress characteristic of the device based on the smooth zero crossing function according to Equation (e):

$$\text{CYCLEDEPTH}(k)=y(k)-y(k-1) \text{ if } u(k)=\text{STRESS}(k) \qquad \text{Equation (e); or}$$

(iii) calculate a cycle time of the stress characteristic of the device based on the smooth zero crossing function according to Equation (f):

$$\text{CYCLETIME}(k)=y(k)-y(k-1) \text{ if } u(k)=t(k) \qquad \text{Equation (f)}$$

where t is the time in seconds at the current cycle k.

13. A method comprising:

obtaining a stress profile of a device disposed onboard industrial equipment, the stress profile representing a stress characteristic of the device over time during operation of the industrial equipment;

determining, via one or more processors, a smooth zero crossing function based on the stress profile, the smooth zero crossing function including spikes that represent reversals of the stress characteristic; and generating, via the one or more processors, a control signal based on the smooth zero crossing function wherein determining the smooth zero crossing function comprises applying a signum function to the stress profile, and applying an exp function to an output of the signum function, wherein an output of the exp function is zero when the output of the signum function is one, and the output of the exp function is one whenever the output of the signum function is not one.

14. The method of claim 13, further comprising calculating a cycle count of the stress characteristic of the device based on an integral of the smooth zero crossing function.

15. The method of claim 14, further comprising:

calculating an average temperature of the device per cycle, an average voltage of the device per cycle, and a cycle depth profile based on the smooth zero crossing function and the cycle count, the cycle depth profile including a change in stress between adjacent spikes in the smooth zero crossing function; and determining a fatigue value of the device attributable to the stress characteristic based on the average temperature, the average voltage, and the cycle depth profile.

16. A control system comprising:

one or more processors configured to:

obtain a state of charge (SOC) profile of a battery pack disposed onboard a vehicle, the SOC profile representing a charge of the battery pack over time during a trip of the vehicle;

determine a smooth zero crossing function based on the SOC profile, the smooth zero crossing function including spikes that represent charge reversals of the battery pack;

calculate a charge cycle count based on the smooth zero crossing function; and generate a control signal to communicate the charge cycle count wherein the one or more processors are configured to determine the smooth zero crossing function by applying a signum function to the SOC profile, and applying an exp function to an output of the signum function, wherein an output of the exp function is zero when the output of the signum function is one, and the output of the exp function is one whenever the output of the signum function is not one.

17. The control system of claim 16, wherein the one or more processors are configured to:

calculate an average temperature of the battery pack per cycle, an average voltage of the battery pack per cycle, and a depth of discharge (DOD) profile based on the smooth zero crossing function and the charge cycle count; and determine a fatigue value of the battery pack attributable to the SOC profile for the trip based on the average temperature, the average voltage, and the DOD profile, wherein the control signal is generated to communicate the fatigue value in addition to the charge cycle count.

* * * * *